Oct. 14, 1958 — M. J. FEGEL — 2,856,018
PACK
Filed March 14, 1956 — 2 Sheets-Sheet 1
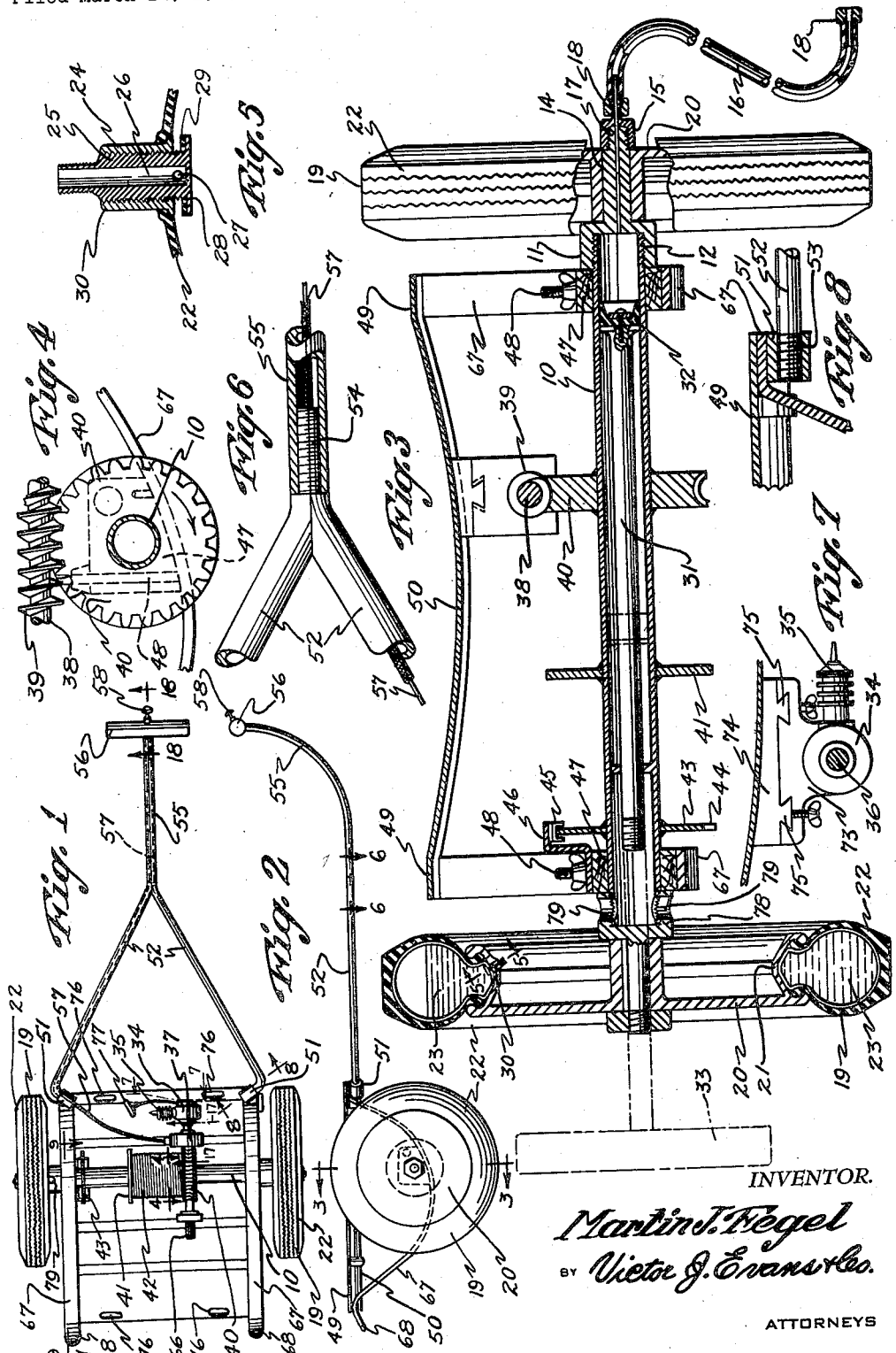
INVENTOR.
Martin J. Fegel
BY Victor J. Evans & Co.
ATTORNEYS

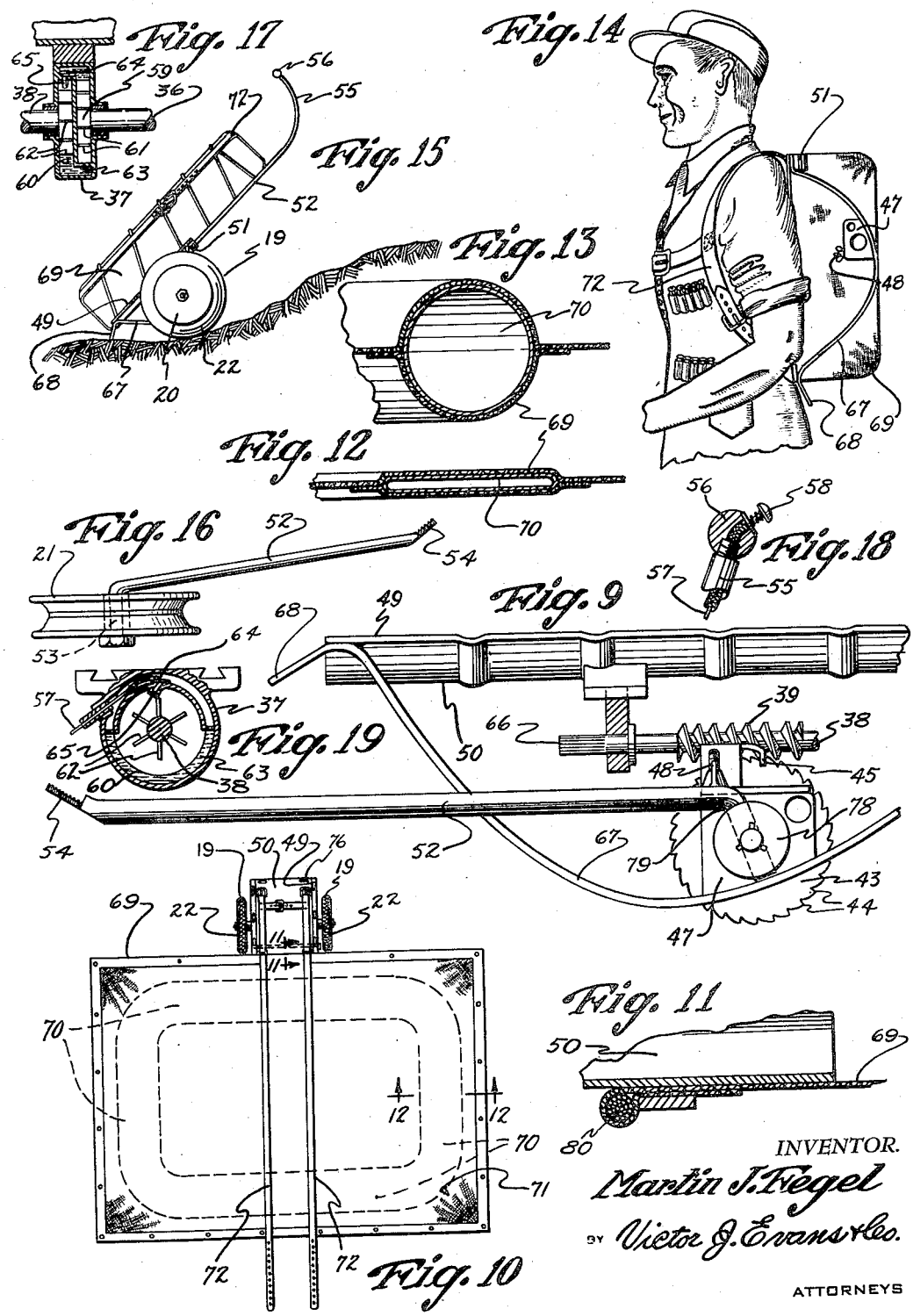

United States Patent Office 2,856,018
Patented Oct. 14, 1958

2,856,018

PACK

Martin J. Fegel, Marysville, Calif.

Application March 14, 1956, Serial No. 571,390

1 Claim. (Cl. 180—19)

This invention relates to a materials handling device, and more particularly to a device for use by hunters or the like.

The object of the invention is to provide a pack cart which is adapted to be used by hunters or the like in transporting game which has been shot or killed and whereby the pack cart of the present invention includes individual parts that can be used for a multiplicity of purposes.

Another object of the invention is to provide a pack cart which may be used as a mobile unit so that heavy game which has been killed can be readily transported and wherein when desired the device can be strapped on a person's back, the pack cart of the present invention including parts which serve dual purposes, as for example when the device is disassembled, certain parts of the wheels can be used as cooking utensils, and whereby parts thereof may be inflated to form a mattress, raft or the like.

A further object of the invention is to provide a pack cart which is extremely simple and inexpensive to manufacture.

Other objects and advantages will be apparent during the course of the following description.

In the accompanying drawings, forming a part of this application, and in which like numerals are used to designate like parts throughout the same;

Figure 1 is a bottom plan view of the pack cart, constructed according to the present invention.

Figure 2 is a side elevational view of the pack cart.

Figure 3 is a sectional view taken on the line 3—3 of Figure 2.

Figure 4 is a sectional view taken on the line 4—4 of Figure 1.

Figure 5 is a sectional view taken on the line 5—5 of Figure 3.

Figure 6 is a sectional view taken on the line 6—6 of Figure 2.

Figure 7 is a sectional view taken on the line 7—7 of Figure 1.

Figure 8 is a sectional view taken on the line 8—8 of Figure 1.

Figure 9 is a sectional view taken on the line 9—9 of Figure 1.

Figure 10 is a view illustrating a cover member for use with the present invention.

Figure 11 is a sectional view taken on the line 11—11 of Figure 10.

Figure 12 is a sectional view taken on the line 12—12 of Figure 10.

Figure 13 is a view similar to Figure 12 but showing the device inflated so that it can be used as a raft, mattress or the like.

Figure 14 is an elevational view illustrating the pack being carried on a hunter's back as when the device is disassembled and folded.

Figure 15 is an elevational view illustrating a load being carried on the device with the device arranged with the wheels thereon.

Figure 16 is a view illustrating one of the wheels disassembled and being used as a frying or cooking pan or utensil.

Figure 17 is a sectional view taken on the line 17—17 of Figure 1 and illustrating the clutch.

Figure 18 is a sectional view taken on the line 18—18 of Figure 1.

Figure 19 is a sectional view taken through the clutch of Figure 17.

Referring in detail to the drawings, the numeral 10 designates a hollow cylindrical housing, Figure 3, and a bushing 11 is arranged in threaded engagement with a threaded end portion 12 of the housing 10. The bushing 11 includes a reduced diameter portion 14 which is provided with a longitudinally extending bore 15 for a purpose to be later described. If desired, a hose or tube 16 may be arranged in threaded engagement with a small diameter section 17, and the tube 16 may have a connecting element 18 thereon.

There is further provided a pair of wheels which are each indicated generally by the numeral 19, and each wheel 19 includes a body portion 20 which may double as a frying pan when the wheel is removed from the pack cart. The wheel 19 further includes a rim portion 21 which has a tire 22 mounted thereon, and the tire 22 may serve as a reservoir for drinking water 23. Each wheel may further include a valve assembly which is shown in detail in Figure 5, and each valve assembly is indicated generally by the numeral 30. The valve assemblies 30 include a collar 24 which extends through the tire 22, and a valve 25 threadedly or adjustably engages the collar 24. The valve 25 is provided with a longitudinally extending passageway 26 and a plurality of ports 27 are provided. The valves 25 are further provided with a flange 28 which carries a gasket 29 so that a tight seal can be effected when desired.

The housing 10 may either be used as an axle as shown in Figure 3, or else it can be used as part of an air pump. Thus, reciprocably arranged within the housing 10 is a rod 31 which has a plunger or piston 32 connected thereto. A handle 33 is adapted to be connected to the rod 31 whereby the rod 31 can be reciprocated within the housing 10 so that the piston 32 will build up air pressure which can be led or conveyed through the hose 16 to any desired location.

Mounted below the housing 10 is a motor 34 of conventional construction, and the motor 34 may include spark plugs 35. The motor 34 is detachably connected to and drives a shaft 36 which is connected to a clutch 37, Figure 17, and a driven shaft 38 extends from the clutch 37. The shaft 38 has a worm 39 mounted thereon, and the worm 39 meshes with a gear wheel 40 which is mounted on and secured to the housing 10. Thus, by actuating the motor 34 and properly adjusting the clutch 37, the motor can be caused to rotate the axle housing 10 whereby the pack cart can be readily propelled along when it is transporting a load.

Mounted on the housing 10 is a partition 41 which may coact with the gear wheel 40 to define therebetween a winch for holding cables such as the cable 42. A disc 43 is also mounted on the housing 10, Figure 3, and the disc 43 has a plurality of teeth 44 which are adapted to form a ratchet for engaging a dog 45, and the dog 45 may be secured to a bracket 46 which extends from a bearing block 47. The bracket 46 may be secured to the bearing block 47 by means of a wing nut assembly 48.

Supported above the housing 10 is a support member 49 which includes a central curved portion 50, and the support member 49 can be used for supporting a load such as a dead animal. Secured beneath the support member 49 are threaded bushings 51, and a pair of angularly arranged arms 52 each include a threaded finger 53 for threadedly engaging the bushings 51. The front end of each of the arms 52 is provided with a threaded portion 54, and a collar or sleeve 55 threadedly engages the threaded portions 54, Figure 6. A handle or crosspiece 56 is mounted on the front end of the sleeve 55 for facilitating the manual gripping or pulling of the device. The handle 56 can also be used for guiding the pack cart when propulsion is provided from the motor 34.

A manually operable means is provided for controlling the clutch 37, and this means comprises a push button 58 which is mounted adjacent to the handle 56. The clutch 37 includes two compartments 59 and 60, Figure 17, and a plurality of vanes or blades 61 are rotatably arranged in the first compartment 59, the vane 61 being secured to the shaft 36. Arranged in the second compartment 60 are vanes 62 which are secured to the shaft 38, and the numeral 63 designates hydraulic fluid which may be arranged within the compartments. A movable valve 64 may have the rear end of a flexible cable 57 connected thereto, while the front end of the cable 57 can be connected to the push button 58. The valve 64 is mounted for movement into and out of closing relation with respect to a port 65 which is adapted to selectively establish communication between the compartments 59 and 60.

As shown in Figure 9, the shaft 38 may be provided with a splined portion 66 whereby when desired power can be supplied to other implements such as saws or the like. The assembly may further include spring members 67 which have their rear ends terminating in transverse portions 68 which may be used as a rest or support for the device when the device is in the position shown in Figure 15.

As shown in Figure 10, a cover member 69 may be provided, and the member 69 may be made of any flexible material such as canvas or plastic. The cover member 69 includes an inner chamber 70 which is adapted to be inflated so that it moves from the position shown in Figure 12 to the position shown in Figure 13 whereby the member 69 can be used as a comfortable mattress, or else it can be inflated to form a raft when crossing bodies of water. The valve 71 is provided whereby the member 69 can be inflated, as for example by means of air from the hose 16. When desired, the pack can be carried on a person's back and for this purpose, straps 72 may be used and the straps can be arranged as shown in Figure 14.

The motor 34 may depend from a block 73 which is adjustably connected to a base 74 through the medium of dovetail joints 75, Figure 7, whereby the dovetail joints 75 permit the motor 34 to be adjusted in relation to the shaft 36.

The member 55 is curved as shown in Figure 2, so that the handle 56 is normally arranged in a position which is convenient to grip in the hands. The member 49 is provided with slots or cutouts 76, whereby straps such as the straps 72 can be extended through these cutouts as when a load is being tied on the device or when the device is strapped on a person's back as shown in Figure 14.

From the foregoing, it is apparent that there has been provided a pack cart wherein the individual parts are each adapted to be used for a multiplicity of purposes. In use, with the cart arranged as shown in Figures 1, 2 and 3, a load such as a deer, or other animal which has been shot or killed can be placed on the support member 49. Then, the cover 69 may be arranged around the load on the member 49, and the straps 72 can be used for securing the load in place as shown in Figure 15. Then, the device can either be pulled by hand by gripping the handle 56 or else the motor 34 can be actuated and actuation of the motor 34 drives the device automatically so that it is not necessary to exert a great deal of effort in pulling the cart. When the cart is not moving, it can be tilted or pivoted backwards slightly as shown in Figure 15, so that the members 68 provide a rest or support for the device. The tires 22 can be used as reservoirs for drinking water 23 as shown in Figure 3, and this water can be placed in or removed from the tires 22 through the medium of the valves 30. Thus, by moving the member 25 of the valve 30 to the position shown in Figure 5, the ports 27 are exposed so that some of the water within the tire can drain out through the passageway 26 and out through the ports 27 to any desired member such as a drinking cup or pot or pan. By screwing in the member 25, the gasket 29 will provide a tight seal between the tire and the flange 28 so that no further water will leak out of the tire.

By removing one of the wheels and certain other parts, a handle such as the handle 33 can be connected to an end of the rod 31 whereby the rod 31 can be reciprocated in the housing 10 so that the plunger 32 during its travel or movement will build up air pressure whereby an air pump will be provided and this air under pressure can be forced out through the passageway 15 and out through the conduit 16 to any desired location. For example, the air from the conduit 16 can be used for inflating the member 69 from the position shown in Figure 12 to the position shown in Figure 13, as for example when the member 69 is to be used as a raft or mattress, instead of a cover.

When the engine 34 is to be used for providing propulsion for the pack cart, the engine 34 is actuated in any suitable manner as for example by means of the pull cable 77. Actuation of the motor 34 causes rotation of the shaft 36 and the shaft 36 extends into the fluid coupling or clutch 37. By manually actuating the push button 58, the cable 57 will control the clutch 37. Thus, by pulling on the cable 57, the valve 64 will move away from the port 65 so that the hydraulic fluid 63 will be able to cause simultaneous rotation of the vanes in the compartments 59 and 60. When these vanes are both rotating, the rotation of the shaft 36 will cause rotation of the shaft 38. As the shaft 38 rotates, it rotates the worm 39, and since the worm 39 meshes with the teeth of the gear wheel 40, then the gear wheel 40 will rotate and cause rotation of the housing or axle 10. As the housing 10 rotates, the wheels 19 will be rotated or driven so that the device can be readily automatically propelled as for example when a heavy load is being moved or transported. The winch including the cable 42 between the partition 41 and the gear wheel 40, can be used for any desired purpose. The splined shaft portion 66 can be used as a power source for driving any suitable implement. As shown in Figure 14, the various parts can be disassembled, as for example the wheels 19 can be removed, and the pack can be strapped on a person's back so that it can be carried as shown in Figure 14 instead of mounted on the wheels whenever desired. The valve 71 may have the same construction as the valve 30 shown in Figure 5.

The ratchet 43 can be used for preventing rotation of the device such as the housing 10 in the wrong direction. However, if desired the ratchet wheel 43 can be eliminated. The parts can be made of any suitable material and of any desired size and shape. The handle 33 may be the same handle as the handle 56, so that one handle will serve several functions. If desired the cover member 69 may be omitted unless it is specifically required as for example as protection against rain squalls, road dust, and the like. If desired, the members 67 can be used as sled runners, when the wheels are removed. As shown in Figure 16, one of the wheels 19 can be removed, and then the tire 22 can be removed so that the member 20 will provide a frying pan, cooking pot or the like, and the arm 52 can provide a handle for the frying pan or other utensil shown in Figure 16. As shown in Figure 3, a bushing 78 may be arranged contiguous to an end of the housing 10, and the bushing 78 may be provided with openings 79 whereby a suitable bar or rod can be extended through the openings 79 as for example when the winch is to be manually operated by hand at which time the motor 34 is disconnected from the shaft 36. Various parts of the device can be disassembled to be used for different purposes, as for example the member shown in Figure 16 can be used as a paddle when the member 69 is inflated to form a raft. As shown in Figure 11, the hem of the canvas or cover 69 may have a piece of rope 80 sewed into it for reinforcing the cover 69 and for preventing slippage of the cover. As shown in Figure 15, the load or cargo can be balanced on the pack cart and then wrapped or enfolded in the canvas and then strapped down tightly. When the winch is being used, the device can be anchored to a tree or the like by suitable straps. The housing 10 can be also used for storing spoons, knives, forks and the like, and the winch can be used for hanging an animal in camp or drawing an animal up a short slope which may be too steep to climb with the load. With the present invention, hunters can transport their kill out of the woods without undue loss of time or energy. The present invention can also be used by fishermen, trappers or the like and also can be used by persons working in civilian defense. Thus, the device can be used for transporting invalids, injured persons or family necessities so that the device will provide a means for crossing flooded areas as well as serving persons in camp. The U-shaped dog 45 shown in Figure 3 may cooperate with the ratchet wheel 43 shown in Figure 3 so as to prevent endwise shifting of the housing 10. The bypass valve 64 is spring-loaded, and the wire 57 can be used for moving the valve 64. The arms 52 can serve as cranks for the winch when the winch is hand operated. The member 55 connects the arms 52 together and also serves as an attaching means for the handle 56. The splined shaft portion 66 can be used for driving small generators, grind stones, saw blades, pumps, boat propellers and the like. The engine may be started when the device is rocked back to the position shown in Figure 15. The entire assembly is light in weight and ruggedly constructed. The present invention can be used by hunters for transporting deer, bear, goat and the like from the place where it is killed into a camp or other place where it can be picked up by a car or truck. With the pack on the back as shown in Figure 14, the person's body can move easily and his arms are free to bring his rifle into action quickly and the pack has a trim, inviting appearance. The pack cart has stability and a low center of gravity. The hooks 68 provide brakes for controlling the load coming down hill or when a stop is made to rest on the upgrade. The opening 79 in the member 78 receives the member 52 which serves as a crank arm when the winch is operated by hand.

I claim:

In a pack cart, a hollow cylindrical housing, a first bushing detachably connected to an end of said housing, a wheel including a body portion provided with a hub rotatably mounted on said bushing, a tire mounted on said body portion, a second bushing connected to the other end of said housing, a wheel mounted on said second bushing and including a hollow tire, bearing blocks mounted on said housing, spring members connected to said bearing blocks, a support member connected to said spring members and including a central arcuate portion, a gear wheel mounted on said housing, a shaft having a worm thereon meshing with said gear wheel, a clutch connected to said shaft, a motor connected to said shaft, a tongue including a pair of angularly arranged hollow arms having their front ends arranged in abutting relation with respect to each other, a sleeve surrounding the front ends of said arms, and a flexible cable having a push button on its front end extended through one of said hollow arms with the rear end of said cable being connected to said clutch.

References Cited in the file of this patent

UNITED STATES PATENTS

| | | |
|---|---|---|
| 905,642 | Brooks | Dec. 1, 1908 |
| 1,322,092 | Browne | Nov. 18, 1919 |
| 1,587,366 | Borchert | June 1, 1926 |
| 2,313,884 | Mattoon | Mar. 16, 1943 |
| 2,401,986 | Talbott | June 11, 1946 |
| 2,446,302 | Newberry | Aug. 3, 1948 |
| 2,532,105 | King | Nov. 28, 1950 |
| 2,680,947 | Weimer | June 15, 1954 |

FOREIGN PATENTS

| | | |
|---|---|---|
| 92,454 | Austria | May 11, 1923 |
| 457,094 | Germany | Mar. 8, 1928 |